June 20, 1961 — J. KOTORA, JR — 2,988,957
AUTOMATICALLY ADJUSTABLE REAR VIEW MIRROR FOR VEHICLES
Filed Oct. 25, 1957 — 2 Sheets-Sheet 1
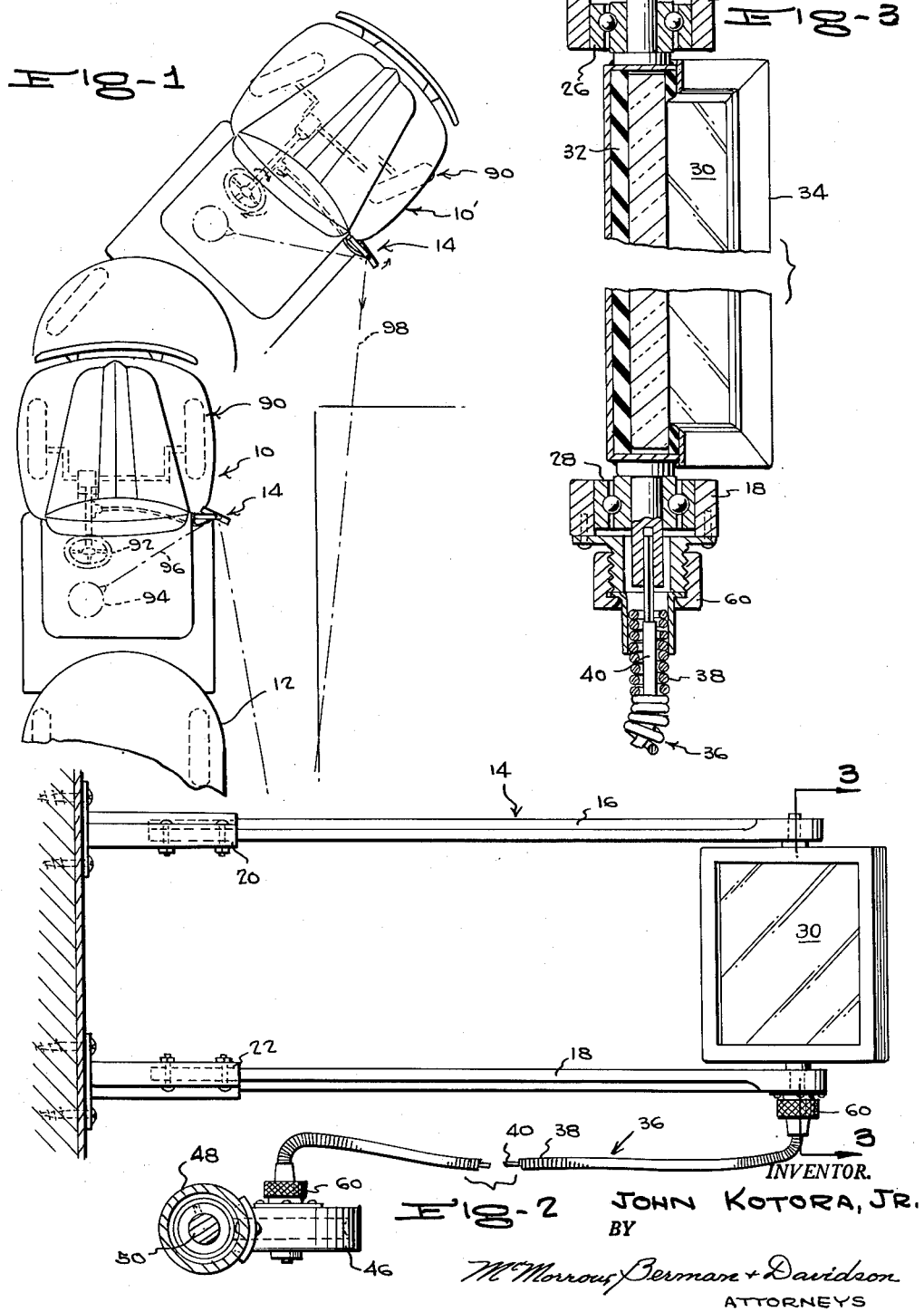
INVENTOR.
JOHN KOTORA, JR.
BY McMorrow, Berman + Davidson
ATTORNEYS June 20, 1961  J. KOTORA, JR  2,988,957
AUTOMATICALLY ADJUSTABLE REAR VIEW MIRROR FOR VEHICLES
Filed Oct. 25, 1957  2 Sheets-Sheet 2
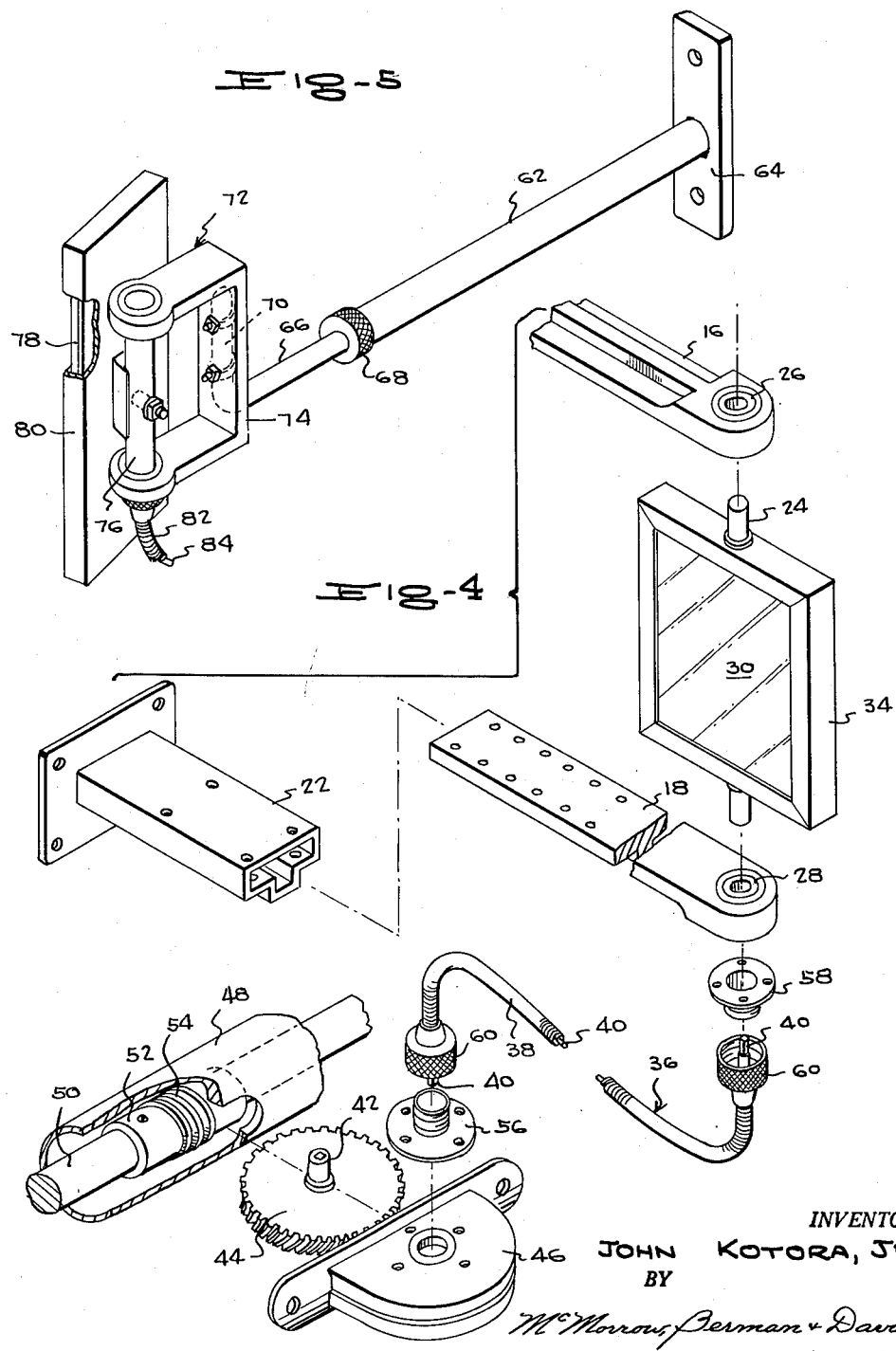
INVENTOR.
JOHN KOTORA, JR.
BY
McMorrow, Berman & Davidson
ATTORNEYS ated June 20, 1961

2,988,957
AUTOMATICALLY ADJUSTABLE REAR VIEW MIRROR FOR VEHICLES
John Kotora, Jr., Codrington Apt. 21D, Bound Brook, N.J.
Filed Oct. 25, 1957, Ser. No. 692,353
3 Claims. (Cl. 88—93)

The present invention relates generally to rear view mirrors for vehicles and specifically to an automatically adjustable rear view mirror.

An object of the present invention is to provide a rear view mirror for a vehicle which is automatic in operation and provides the driver of a vehicle on which it is installed with a view to the rear of the vehicle while the vehicle is making a turn.

Another object of the present invention is to provide a rear view mirror which may be installed on vehicles of all sizes but which is especially suitable for installation upon a tractor-trailer combination which is of necessity incapable of making short turns and in which the operator requires a view to the rear while such turns are being made.

These and other objects and advantages of the present invention will be fully apparent from the following description when taken in connection with the annexed drawings, in which:

FIGURE 1 is a plan view of a portion of a tractor-trailer combination showing the rear view mirror of the present invention installed thereon, the dotted line showing the tractor in a position partially turning to the right, the rear view mirror of the present invention being automatically adjusted so that the operator has a line of sight to the rear;

FIGURE 2 is an elevational view of the rear view mirror according to the present invention, a portion of the flexible cable being broken away;

FIGURE 3 is a sectional view, on an enlarged scale, taken on the line 3—3 of FIGURE 2;

FIGURE 4 is an isometric exploded view of the assembly shown in FIGURE 2 with one of the support brackets omitted; and FIGURE 5 is an isometric view of a modified form of the present invention.

Referring in greater detail to the drawings in which like numerals indicate like parts throughout the several views, in FIGURE 1 the reference numeral 10 designates the tractor and the numeral 12 designates the forward end portion of a trailer in a tractor-trailer combination. The reference numeral 10' designates the tractor in position making a turn to the right. The rear view mirror of the present invention is designated generally by the reference numeral 14.

The rear view mirror 14 is shown in FIGURES 2 and 3 and comprises a pair of horizontally disposed arms 16 and 18 projecting outwardly from one side of the tractor 10 and having one end of each secured in a hollow bracket 20 and 22, respectively, secured to the tractor 10. Each bracket 20 and 22 is of hollow T-shaped formation in cross-section, as shown in FIGURE 4, with reference to the bracket 22. The arms 16 and 18 are conformably shaped to fit within the respective brackets 20 and 22.

A vertically disposed rotatable shaft 24 is carried by the ends of the arms 16 and 18 remote from the brackets 20 and 22, there being a bearing assembly 26 and 28 interposed between the shaft 24 and the free ends of the arms 16 and 18, as shown in FIGURE 3.

An upstanding mirror 30, supported in a resilient member 32 carried by a frame 34, is mounted on the shaft 24 for movement therewith.

A flexible drive assembly, designated generally by the reference numeral 36, including a flexible sheath 38 and a rotatable shaft 40, has one end of the shaft 40 received in and secured to the lower end of the shaft 24 and has the other end received in an upstanding hub 42 projecting from one side of a gear 44, as shown in FIGURE 4.

The gear 44 is mounted within a housing 46 for rotation about the hub 42 as an axis and the housing 46 is fixedly secured to one side of the steering column 48 of the tractor 10. On the steering shaft 50, within the column 48, is a drive take-off means or sleeve 52 having worm teeth 54 formed thereon. The teeth of the gear 44 mesh in the worm teeth 54 for drivably connecting the steering shaft 50 to the flexible shaft 40 and therefore to the mirror shaft 24.

A flanged coupling 56 is positioned exteriorly of the housing 46 and forms a means for connection of the sheath 38 of the flexible drive assembly 36 to the housing 46. A similar flanged coupling 58 forms the means of securing the other end of the sheath 38 to the underside of the lower arm 18, the flexible drive assembly being provided with knurled nuts 60 at each end thereof for securement to the couplings 56 and 58.

Referring to FIGURE 5, a modified form of the support means for the mirror of the invention is shown in which a single support arm 62 has one end fixedly secured by welding or other means to a vertical plate member 64 which may be secured to the side of the tractor or other vehicle on which the rear view mirror of the present invention is to be installed. The arm 62 is tubular and a rod 66 projects from the free end of the arm 62 and is adjustably secured in any position inwardly or outwardly from the vehicle by means of a knurled nut 68. The free end portions of the arm 62 is split or otherwise conventionally formed so that tightening of the nut 68 thereon secures the rod 66 within the arm 62.

The free end of the rod 66 is bent upwardly as at 70 to form a means for support thereon of a U-shaped member 72 which has its bight 74 fixed to an upwardly portion of the rod 66.

The free end of the rod 66 is bent upwardly as at 70 to form a means for support thereon of a U-shaped member 72 which has its bight 74 fixed to an upwardly portion of the rod 66.

A vertically disposed shaft 76 is mounted in the free ends of the legs of the U-shaped members 72 for rotation about a vertical axis. A mirror 78 carried in the frame 80 is secured to the shaft 76 for movement therewith. Suitable bearing means is provided in each of the legs of the member 72 for support of the shaft 76 and the flexible drive shaft assembly 82 has its flexible shaft 84 operatively connected to the lower end of the shaft 76. The other end of the flexible shaft 84 of the assembly 82 is operatively connected to the same drive mechanism as shown in FIGURE 2 which connects the shaft 40 to the steering column shaft 50.

The steering shaft 50 is part of the steerable wheel assembly of the tractor 10, such assembly being shown in dotted lines and designated by the reference numeral 90.

The steerable wheel assembly is conventional and includes the steering wheel 92 by means of which the tractor is steered. The reference numeral 94 indicates the position of the head of the operator of the vehicle with the dotted line (FIGURE 1) designated by the reference numeral 96 indicating the line of sight of the operator of the vehicle into the rear view mirror 14 and thence to the rear of the trailer 12. It will be seen that as the tractor 10 moves to the position indicated by 10' as in turning a corner to the right, the means connecting the mirror 30, 78, to the steerable wheel assembly 90 effects the movement of the mirror 30, 78, responsive to the movements of the assembly 90 as caused by the rotation of the steering wheel 92 by the operator of the tractor. This changes the angle of the line of sight from the dotted line marked 96 to a second line of sight designated by the reference numeral 98 in FIGURE 1. It will be seen, therefore, that the operator in both positions of the tractor 10 is enabled to see to the rearward of the trailer 12 in order that the operator be informed of anybody approaching on the right side of the trailer 12. Upon straightening of the tractor to a new course for straightforward movement on the roadway, the mirror 30, 78, will be returned to its former position by the rotation of the steering column shaft 50 in the opposite direction.

While only preferred embodiments of the present invention have been shown and described, other embodiments are contemplated and numerous changes and modifications may be made therein without departing from the spirit of the invention as set forth in the appended claims.

What is claimed is:

1. The combination with a motor vehicle having a steerable wheel assembly including a rotatable steering column shaft, and a drive take-off means on said shaft, of a rear view mirror positioned so that it projects outwardly from one side of said vehicle and connected to said vehicle for free swinging movement about a vertical axis, and means connecting said mirror to said drive take-off means so that movement of said mirror is responsive to rotational movement of said steering column shaft, said means including a gear drivingly engaging said drive take-off means and a flexible driven shaft having one end drivingly connected to said mirror and having the other end connected to said gear.

2. The combination with a motor vehicle having a steerable wheel assembly including a rotatable steering column shaft, and a worm on said shaft, of a rear view mirror positioned so that it projects outwardly from one side of said vehicle and connected to said vehicle for free swinging movement about a vertical axis, and means connecting said mirror to said worm so that movement of said mirror is responsive to rotational movement of said steering column shaft, said means including a gear in meshing engagement with said worm, and a flexible driven shaft having one end drivingly connected to said mirror and having the other end connected to said gear.

3. The combination with a motor vehicle having a steerable wheel assembly including a rotatable steering column shaft, and a worm on said shaft, of a horizontally disposed arm projecting outwardly from one side of said vehicle and having one end secured to said vehicle, a vertically disposed rotatable shaft carried by the other end of said arm, an upstanding mirror mounted on said shaft for movement therewith, a gear in meshing engagement with said worm, and a flexible driven shaft having one end drivingly connected to said vertically disposed shaft and having the other end connected to said gear.

References Cited in the file of this patent

UNITED STATES PATENTS

| | | |
|---|---|---|
| 516,910 | Bucherer | Mar. 20, 1894 |
| 1,274,130 | Winkleman | July 30, 1918 |
| 1,538,114 | Hoffman | May 19, 1925 |
| 1,666,856 | Holliday | Apr. 17, 1928 |
| 1,866,324 | Russo | July 5, 1932 |
| 1,952,346 | Wettstein | Mar. 27, 1934 |
| 2,326,316 | Allen | Aug. 10, 1943 |
| 2,456,362 | Aves | Dec. 14, 1948 |
| 2,472,438 | Price | June 7, 1949 |
| 2,573,443 | Holland | Oct. 30, 1951 |
| 2,626,539 | Peterson | Jan. 27, 1953 |
| 2,664,029 | Higgins | Dec. 29, 1953 |
| 2,696,142 | Langford | Dec. 7, 1954 |
| 2,854,892 | Stark | Oct. 7, 1958 |
| 2,856,817 | Garden | Oct. 21, 1958 |

FOREIGN PATENTS

| | | |
|---|---|---|
| 95,927 | Sweden | Apr. 5, 1939 |
| 627,998 | Germany | Mar. 27, 1936 |